(12) United States Patent
Morishita et al.

(10) Patent No.: US 7,245,435 B2
(45) Date of Patent: Jul. 17, 2007

(54) LENS ARRAY SHEET AND MOLDING METHOD

(75) Inventors: Kenichiro Morishita, Kanagawa (JP); Koichi Sano, Kanagawa (JP)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 10/535,322

(22) PCT Filed: Dec. 16, 2003

(86) PCT No.: PCT/US03/40033

§ 371 (c)(1),
(2), (4) Date: May 18, 2005

(87) PCT Pub. No.: WO2004/059348

PCT Pub. Date: Jul. 15, 2004

(65) Prior Publication Data

US 2006/0072199 A1    Apr. 6, 2006

(30) Foreign Application Priority Data

Dec. 16, 2002   (JP) .............................. 2002-364198

(51) Int. Cl.
*G02B 27/10* (2006.01)
(52) U.S. Cl. ..................... 359/619; 359/641; 359/642
(58) Field of Classification Search ............... 359/619, 359/621, 641, 642, 726
See application file for complete search history.

(56) References Cited

U.S. PATENT DOCUMENTS

| | | | |
|---|---|---|---|
| 5,521,725 A | 5/1996 | Zimmerman et al. |
| 5,839,823 A | 11/1998 | Kuper et al. |
| 5,949,933 A | 9/1999 | Beeson et al. |

FOREIGN PATENT DOCUMENTS

| | | |
|---|---|---|
| EP | 1014114 | 6/2000 |
| JP | 63034501 | 2/1988 |
| JP | 01065502 | 3/1989 |
| JP | 10104405 | 4/1998 |
| WO | WO 0243937 | 6/2002 |

*Primary Examiner*—Timothy Thompson
*Assistant Examiner*—Jerry Fang

(57) ABSTRACT

To provide a lens array sheet capable of efficiently condensing diffuse light such as the light from a LED light source or EL light source. The lens array sheet comprises a transparent base material, a plurality of light-receiving sections each consisting of a transparent right frustum which is provided on the surface of the base material and is tapered outwardly from the base material, and a plurality of condensing lenses disposed on the back of the base material so as to face the respective light-receiving sections. The side face of the right frustum forms a taper angle larger than 0° and less than 15° with the central axial line of the right frustum, and an aspect ratio (H/D) which is a proportion of the height (H) of the right frustum to the minimum length (D) of the cut surface of the right frustum is larger than 0, and no more than 10.

8 Claims, 6 Drawing Sheets

LENS ARRAY SHEET AND MOLDING METHOD

CROSS REFERENCE TO RELATED APPLICATIONS

This application is a US National Stage of PCT International Application Ser. No. PCT/US2003/040033 filed Dec. 16, 2003, which claims priority from Japanese Application No. 2002-364198, filed Dec. 16, 2002.

FIELD OF THE INVENTION

The present invention relates to a thin lens array sheet capable of condensing diffuse light on a light-utilizing surface effectively and a molding method suitable for manufacturing a minute structure molded object like the thin lens array sheet.

BACKGROUND OF THE INVENTION

In an imaging section of an image-forming apparatus such as a copying machine or a laser printer, a scanning system using a polygon mirror, or a LED head system performing high speed writing by using a head provided with a light emitting diode (LED) light source or an electro-luminescence (EL) light source is used. The latter system is preferred because it increases the copying speed and/or printing speed. However the latter system is inferior in an effective use of light because a LED light source or EL light source is generally a diffuse-light source. That is, in the imaging section generally consisting of a light source, an image-forming lens system, and a photosensitive drum, such a diffuse-light source is inferior in the amount of light to be applied to the image-forming lens system, thereby causing wasted power consumption. Furthermore, a diffuse-light source inferior in the amount of light to be applied to the image-forming lens system results ineffective use of light at the last photosensitive drum. For this reason, in order to increase the amount of light to be applied to the photosensitive drum, the effective area of the image-forming lens system (a self-focusing lens array which is a kind of rod lens array, called "SLA" hereinafter) is generally increased (that is, the number of SLAs is increased). However, since a SLA is costly, it is not economical to increase the number of SLAs.

On the other hand, there is a member which is not used for an image-forming apparatus such as a copying machine or printer, but is used to utilize diffuse light effectively. Such member is a lens array sheet for a liquid crystal display having optical elements which collimate the light supplied through a light transmission plate from the backlight device of the liquid crystal display toward the front side of a person viewing the liquid crystal display (see, for example, patent literatures 1 and 2).

When this member is used for an image-forming apparatus using a LED head system, since the light source is a diffuse-light source such as a LED light source or EL light source and has a distribution of light emission angles different from that of the light supplied through a light transmission plate from a backlight device, solid and minute optical elements tapered in an angle between 15° and 45° as specifically described in the above patent literature 1 can not apply light to SLAs effectively. For this reason, in case of a LED head system, a lens array sheet capable of applying the light from a LED light source or EL light source to SLAs more effectively, that is, in higher amount, is desired.

Furthermore, the image-forming apparatus can be downsized by reducing the number of SLAs and the diameters of lenses constituting the SLAs.

On the other hand, a molded object such as a lens array sheet is required to have minute protrusions having a high aspect ratio, along with the requirement of miniaturizing a light source and/or increasing the amount of light to be utilized. It is becoming difficult to manufacture such a molded object with high accuracy by conventional technology.

As an existing method of manufacturing a precision plastic lens, there is what is called an injection molding method of injecting hot-melt resin into a metallic female mold under a certain temperature and pressure condition and cooling it (see, for example, patent literature 3). In addition, there is a photopolymer method of charging photosetting polymer, which is the material of a product, into a metallic mold, sealing it with material transparent to light for setting it, applying the light to the photosetting polymer through the transparent material to set it, and then releasing the product from the mold. At present, as a method of manufacturing a lens array with plastic, a plastic lens manufacturing method utilizing the above injection molding method or photopolymer method is used.

However, when optical elements constituting a lens array are minute structures which are arranged in high density and have a high aspect ratio, the above manufacturing method can not be used from resin-charging and product-releasing points of view. That is, when optical element lenses are not typical spherical lenses or non-spherical lenses, or when optical elements are shaped like a tapered corn and are minute structures which are sized in nanometers to microns and have a high aspect ratio, the viscosity of charged resin is still high even if the temperature of it is increased, and the resin and the metallic mold grapples together like a fastener after molded, and thereby it is difficult to release the whole of the molded resin from the mold. In order to release the molded resin from the mold easily, it has been tried that fluorinated resin or silicon resin is coated on the surface of the mold as release agent, but it has not been easy to release a lens array having protruded minute elements which are flexible, have a small taper angle and a high aspect ratio, and are arranged in high density.

SUMMARY OF THE INVENTION

In an aspect, the present invention provides a lens array sheet comprising a transparent base material, a plurality of light-receiving sections each consisting of a transparent right frustum which is provided on the surface of the base material and is tapered outwardly from the base material, and a plurality of condensing lenses disposed on the back of the base material so as to face the respective light-receiving sections, wherein the side face of the right frustum forms a taper angle larger than 0° and less than 15° with the central axial line of the right frustum, and an aspect ratio (H/D) which is a proportion of the height (H) of the right frustum to the minimum length (D) of the cut surface of the right frustum is larger than 0, and no more than 10.

Such an array sheet is capable of effectively condensing diffuse light such as the light from a LED light source or EL light source on a light-utilizing surface. Thus, when the above lens array sheet is used for condensing the light from such a light source on a light-utilizing surface in an image-forming apparatus using such a light source as a light source for forming an image, the amount of light to be utilized is increased, and thereby the number of self focusing lens arrays constituting the image-forming lens system of the image-forming apparatus can be decreased.

In another aspect, the present invention provides a molding method comprising steps of: coating the inner surface of a meltable mold with fluorinated material; charging energy radiation curing resin into the mold; applying energy radiation to the energy radiation curing resin; and melting the mold.

Such a molding method is suitable for manufacturing a lens array sheet having minute protrusions having a high aspect ratio and is capable of molding the lens array sheet with high accuracy and releasing it from the mold easily.

In this specification, it is defined that the term "meltable" includes "fusible" meaning that solid object is liquefied by heat, "soluble" meaning that solid object is liquefied by being immersed into liquid, and "biodegradable".

BRIEF DESCRIPTION OF THE DRAWINGS

FIG. 3(a) shows an optical element having a fresnel condensing lens, and FIG. 3(b) shows an optical element having a spherical condensing lens.

DETAILED DESCRIPTION OF THE INVENTION

The basic principle of a lens array sheet according to the present invention is to totally reflect the light emitted from a diffuse-light source at the interface between optical element right frustums and an external material (e.g., air), and direct the reflected light toward the condensing lenses by which the reflected light is condensed on a light-utilizing surface. The condensed light can be launched into SLAs with a minimum of loss caused by the diffusion.

Each of the optical elements is designed as follows.

Figure 1:
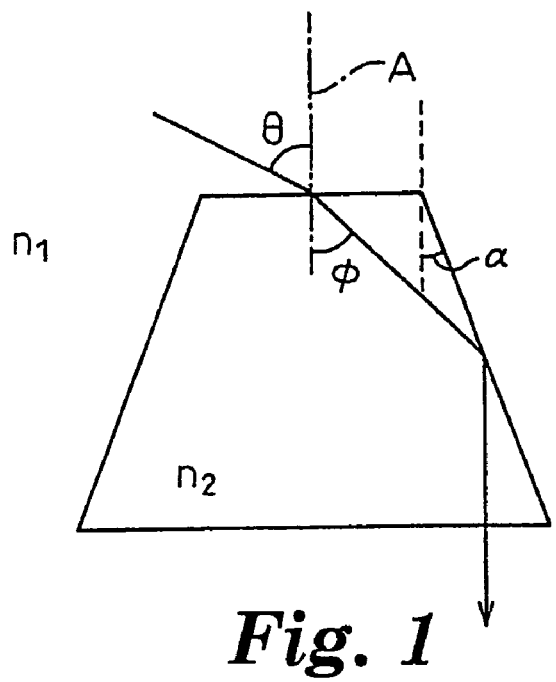
FIG. 1 is a schematic diagram showing a path of the light incident from the environmental medium with a refraction index n1 to the optical element with a refraction index n2 with an incident angle θ.

FIG. 1 schematically shows a path of light incident from the environmental medium with a refraction index n1 (e.g., air whose refraction index is 1) to the optical element with a refraction index n2 with an incident angle θ. When the refraction angle of the incident light in the optical element is φ, the taper angle α in case that the light going out of the optical element is parallel with the central axial line of the optical element is roughly calculated as follows.

taper angle $\alpha = \phi/2 = \arcsin((n1/n2)\sin \theta)/2$

Thus, when the incident angle of the highest intensity light is θ, the taper angle α calculated by using the above equation minimizes the loss of the light. It has turned out that it is desirable in the present invention that α is larger than 0° and less than 15° when the light source is a diffuse-light source such as a LED light source or EL light source.

Figure 2:
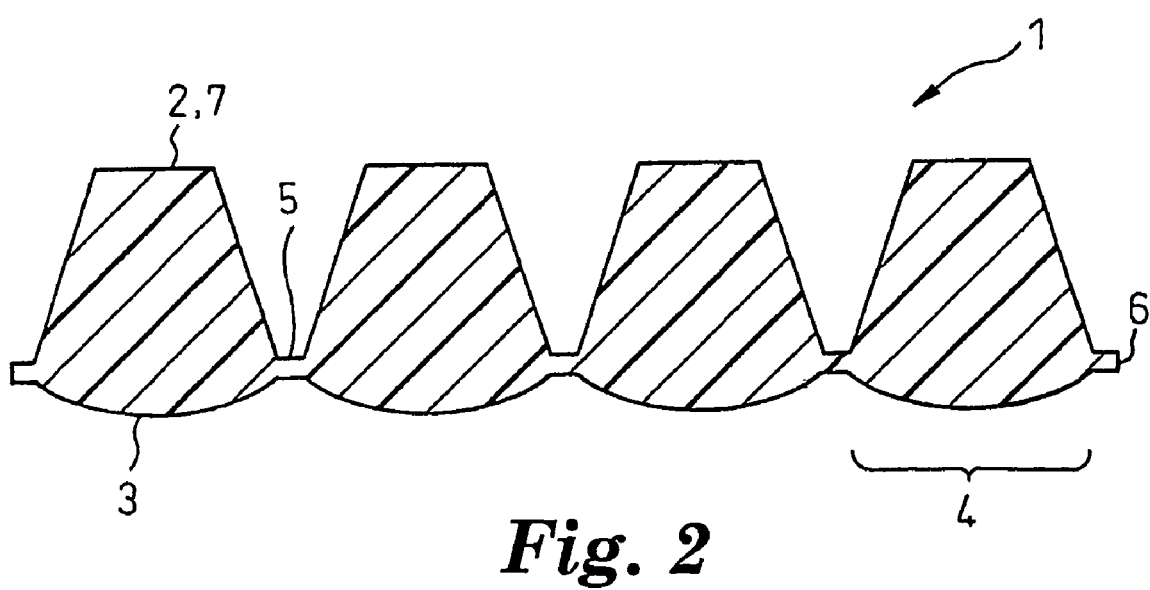
FIG. 2 is a cross-sectional view of an embodiment of a lens array sheet according to the present invention.
Figure 3:
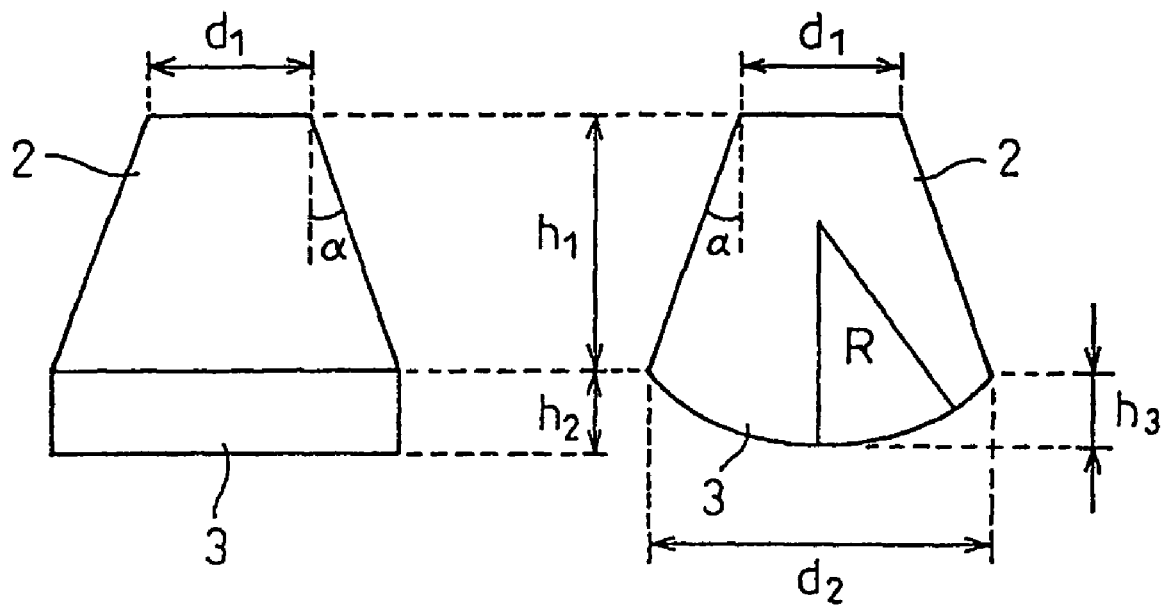
FIG. 3 is a cross-sectional views of optical elements.

FIG. 2 is a cross-sectional view of an embodiment of a lens array sheet according to the present invention. The lens array sheet 1 comprises a plurality of optical elements 4 each of which has a light-receiving section 7, provided on the surface of a base material 6, consisting of a right frustum 2 such as a right pyramid frustum, right corn frustum, or right ellipsoid frustum, and has a condensing lens 3 provided on the back of the base material in the position opposed to the right frustum 2. Thus, the base material 6 comprises connecting sections 5 which connect the optical elements 4. FIG. 3 shows cross-sectional views of optical elements. FIG. 3(a) shows an optical element whose condensing lens is a fresnel lens, and FIG. 3(b) shows an optical element whose condensing lens is a spherical lens. The top surface of an optical element is in contact with a light source, the length (d1) of the top surface is substantially the same as that of the light source, and the shape of the top surface is polygon, circle, or ellipse. The length (d1) means a minimum length of a cut surface. In this specification, term "minimum length of a cut surface" means a minimum length of the smallest rectangle surrounding the cut surface of a right frustum providing the top surface of an optical element. Thus, when the cut surface is a circle, the minimum length is the diameter of the circle, when the cut surface is an ellipse, the minimum length is the shorter axis length of the ellipse, when the cut surface is an equilateral triangle, the minimum length is the length of one side of the equilateral triangle, and when the cut surface is a square, the minimum length is the length of one side of the square. Further, when the cut surface is a triangle other than an equilateral triangle, the minimum length is the shorter one of the length of the shortest of the three sides or the length of the shortest of the vertical lines from the vertexes to the respective opposite sides. Furthermore, when the cut surface is a quadrangle other than a square, the minimum length is the shorter one of the length of the shortest of the four sides or the length of the shorter of the two diagonal lines. When a LED light source or EL light source is used, the length (d1) is usually hundreds nanometers to hundreds microns. The height (h1) of the right frustum is related with d1 by the aspect ratio (h1/d1). It is desirable that the aspect ratio is as large as possible in order to increase the directivity of light, but the aspect ratio is usually larger than 0, and no more than 10, preferably 3 to 5, and most preferably about 5 because of the geometrical constraints that the optical elements overlap with the adjacent ones corresponding to the adjacent light source elements.

The condensing lenses constituting the optical elements may only have such a focal length that the light directed to the condensing lens by the right frustums is effectively condensed on a light-utilizing surface such as the light-receiving surface of a SLA. The condensing lenses may be fresnel lenses, spherical lenses, non-spherical lenses, cylindrical lenses, or lenticular lenses constituted by cylindrical lenses arranged in parallel with each other. The focal length is designed using a thickness h2, or h3 and a curvature radius R so as to match a light-receiving surface.

The material of a lens array sheet according to the present invention may only be but not limited to material transparent for the wavelength of the light from a light source such as a LED light source or EL light source. Such material may be glass or plastic material, and is preferably plastic material from a workability point of view. Preferred plastic material is acrylic resin, polyester resin, polycarbonate resin, urethane resin, epoxy resin, polystyrene resin, or mixture of them.

The lens array sheet may be manufactured by a lithography method or molding method. In the molding method, the lens array sheet may be replicated by using a metallic mold with thermoplastic resin, or a thermosetting resin or ultraviolet-rays-curing resin. The lens array sheet may also be manufactured by independently making a sheet having an array of protrusions such as right frustums, in which a light-receiving section and a transparent base material are integrated, and a sheet having a array of lenses, in which condensing lenses and a transparent base material are integrated, and by laminating the both sheets to each other. Furthermore, the lens array sheet may also be manufactured by forming a lens array on a transparent base material in advance, placing a mold, in which light-curing resin is charged, on the lens array to allow the mold to make a contact with the lens array, and applying energy radiation to the light-curing resin through the lens array to cure the light-curing resin to integrate the lens array and the light-curing resin.

When a lens array sheet according to the present invention, especially a lens array sheet having successive minute protrusions having a high aspect ratio, is manufactured, even if it is tried to replicate the lens array sheet by using a metallic mold and thermoplastic resin, the resin does not sufficiently come into the tips of the protrusions, and thereby the lens array sheet may not be formed accurately in the shape given by the metallic mold. Furthermore, when the lens array sheet is replicated by using a metallic mold and thermosetting resin, even if the metallic mold has been treated with fluorinated resin or silicone resin of release agent, the minute protrusions having a high aspect ratio may be damaged when the lens array sheet is released from the metallic mold.

Now, it has been found that the following method is suitable for manufacturing a molded object such as a lens array sheet having minute protrusions having a high aspect ratio. That is, the present invention provides a molding method comprising a step (a) of coating the inner surface of a meltable mold with fluorinated material, a step (b) of charging energy radiation curing resin into the mold, a step (c) of applying energy radiation to the energy radiation curing resin, and a step (d) of melting the mold. As the energy radiation, ultraviolet rays, electron rays, X-rays, γ-rays, or the like may be used.

Figure 4:
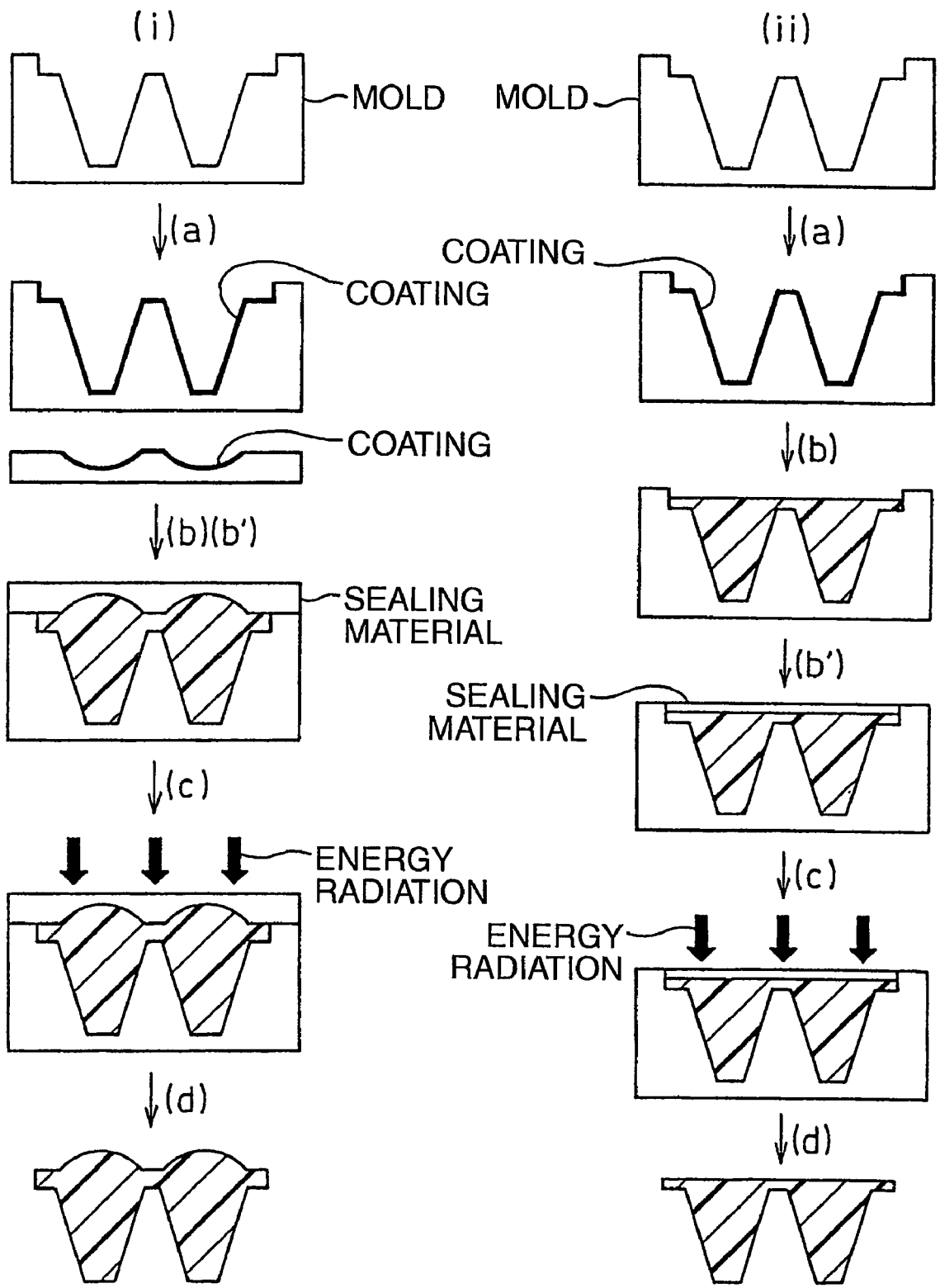
FIG. 4 is a process diagram showing processes of molding a lens array sheet.

A method of manufacturing a lens array sheet according to the present invention is described in detail below. FIG. 4 shows processes of molding a lens array sheet. FIG. 4(i) shows a process of molding a light-receiving section and a condensing lens section in one piece, and FIG. 4(ii) shows a process of molding a light-receiving section and a condensing lens section independently and then putting together the both sections in a laminate structure.

At first, a mold is formed so as to have the female pattern of a lens array having arranged protrusion-like lenses to be manufactured. The mold is made of meltable material such as fusible, soluble, or biodegradable material. The mold may be made of, for example, wax or water-soluble resin, and preferably material capable of being removed by being fused by heat, or being dissolved with 100° C. or less hot water. The mold made of wax preferably has low crystallinity and a smooth surface. For this reason it is preferably made by being cooled rapidly. The wax may be synthetic wax such as paraffin wax or microcrystal wax, natural wax such as Japan wax or beeswax, or wax made by mixing other material such as filler into the synthetic or natural wax. In addition, the wax preferably has a low volume shrinkage ratio from a moldability point of view. Furthermore, the water-soluble resin may be polyethylene oxide (PEO), polyvinyl alcohol (PVOH), or the like. Furthermore, the biodegradable material may be biodegradable resin such as polylactic acid. The mold may be formed by cutting out a female pattern of a lens array or by replication from a metallic mold. The mold is preferably transparent to energy radiation such as ultraviolet rays, because the energy radiation can be applied to a lens array sheet through the mold in the resin curing process (c) described later.

In coating forming process (a), fluorinated compound coating is formed on the surface of the mold. Such coating prevents low viscosity energy radiation curing resin from melting into the mold upon resin injection in the next process. The fluorinated compound is preferably alcohol, acrylic ester, methacrylic acid ester, or the like containing fluoroalkyl group, preferably perfluoroalkyl group as much as possible, and is preferably capable of being diluted with fluorinated ether solvent having a high volatility. Specifically, the mold is coated with, for example, compound containing perfluoroalkyl group, in a thickness of few to tens of nanometers, by a suitable method such as dipping, spraying, or brushing. In order to form thin coating, the compound containing perfluoroalkyl group is preferably diluted with fluorinated ether solvent such as hydrofluoroether class (HFE).

In resin injecting process (b), energy radiation curing resin with low viscosity enough to spread to and wet the tips of the protrusions of the mold under the injection condition is injected into the mold. For example, light-curing monomer with approx. 10 to 1000 cp viscosity at resin injection temperature such as room temperature (approx. 25° C.), or energy radiation curing resin containing mixture of such energy radiation curing monomer and energy radiation curing oligomer is poured into the mold under a reduced pressure. At that time, the mold may be accommodated in a metal case or energy radiation permeating case so that the energy radiation curing resin does not leak out. As the energy radiation curing resin, material transparent after curing is selected. That is, material having a less number of colors (APHA) is better, and material having 100 or less colors is preferred. Specifically, acrylate monomer or oligomer is preferred. When light such as ultraviolet rays is used as energy radiation for curing the energy radiation curing resin, the energy radiation curing resin contains photoinitiator which is usually 0.05 to 1% with respect to the weight basis of monomer or oligomer. The photoinitiator may be selected to suit with the wavelength of curing-light. For example, Darocure (trade name) or Irgacure (trade name) available from Ciba Specialty Chemicals, or the like may be used.

If required, the energy radiation curing resin is sealed with material such as glass or polyethylene telephthalate (PET) transparent to energy radiation in sealing material lamination process (b'). Such sealing material may be covered with coating as described above. By sealing the energy radiation curing resin with sealing material, invasion of water into the energy radiation curing resin can also be prevented when it is curing in cold water in the next process. When the shape of the sealing material corresponds to that of the condensing lens section as shown in FIG. 4(i), the light-receiving section and the condensing lens section can be molded in one piece. When the energy radiation curing resin is set with electron rays, this process is omitted.

In resin curing process (c), energy radiation is applied to the energy radiation curing resin to cure it. When ultraviolet rays are used, 10 to 50 mJ/cm² ultraviolet rays having wavelength corresponding to the selected wavelength of the above photoinitiator are applied to the energy radiation curing resin several times to cure it. In order to prevent the mold from melting due to heat generation at polymerization of the energy radiation curing resin, energy radiation is applied to the energy radiation curing resin, for example, in cold water to cure the energy radiation curing resin while cooling it until the whole of it is cured.

In mold-removing process (d), the mold is removed. The mold is washed away with hot water or solvent which does not react with the cured resin. At that time, suitable amount of surface-active agent may be mixed with the hot water or the solvent. The surface-active agent is preferably of high hydrophilic nature, and may be anyone of cationic, anionic, and nonionic surface-active agents. Nonionic surface-active agents include Nonipole, Ionet, and Octapole available from Sanyo Kasei Co., Ltd., etc.

According to the process shown in FIG. 4(i), a lens array sheet is completed. In case of FIG. 4(ii), a sheet having an array of protrusions is formed. In this case, a sheet having an array of condensing lenses is formed in just the same manner as described above, and then it is laminated with the above sheet having an array of protrusions to complete a lens array sheet. Since the sheet having an array of condensing lenses has a low aspect ratio, it may be formed by a conventional method such as an injection molding method using a metallic mold.

A lens array sheet according to the present invention may be used for condensing light to an object in an image display apparatus using an EL light source or LED light source in addition to for condensing light from an EL light source or LED light source to an object in an electronic image-forming apparatus. The lens array sheet thus contributes to the improvement of the brightness and the reduction of the power consumption. In addition, the lens array sheet may be used for a rear lamp or side lamp of a vehicle to improve the visibility of the lamp, or used as the cover of a light of a house to improve the illumination of the light and reduce the power consumption.

A molding method according to the present invention is not limited to manufacturing a lens array sheet. For example, elastic body or viscoelastic body (e.g., rubber-based material) may be used as molded material to manufacture an elastic body sheet or a viscoelastic body sheet which is provided with protrusions having a high aspect ratio on the surface of it. Furthermore, provided that the scope and object of the present invention are not impaired, a molded object having minute protrusions which has a high aspect ratio and are arranged in high density (e.g., mechanical fastener, friction control material applicable to a paper feeding roller, or the like) may be manufactured, in addition to the above lens array sheet, by a molding method according to the present invention.

EXAMPLES

Example 1

1. Preliminary Design

Figure 5:
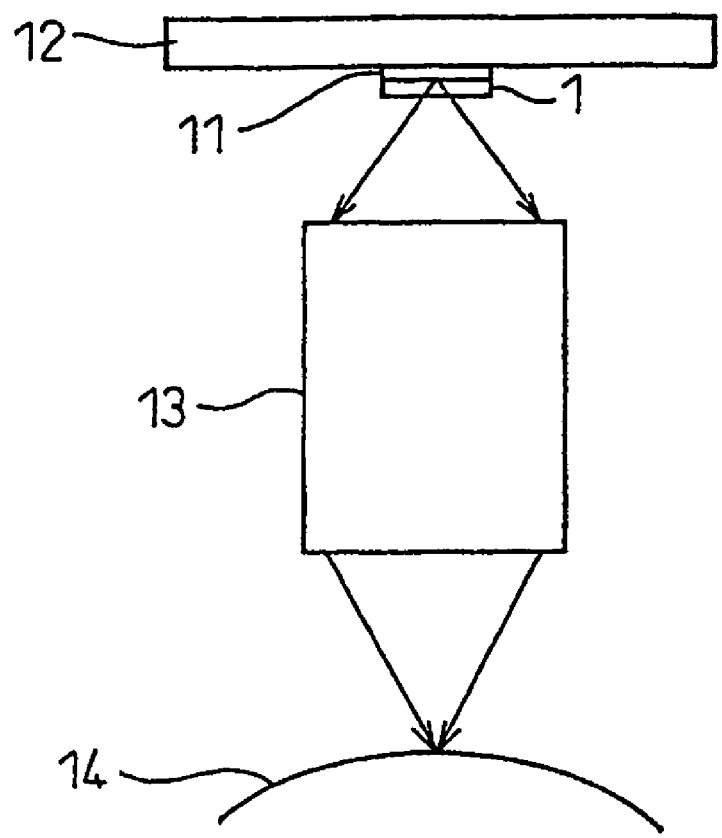
FIG. 5 is a configuration diagram showing a system consisting of an EL light source, lens array sheet, SLA, and photosensitive drum.
Figure 6:
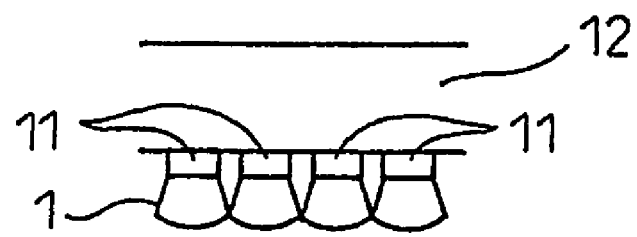
FIG. 6 is an enlarged cross-sectional view of an EL light source and lens array sheet.
Figure 7:
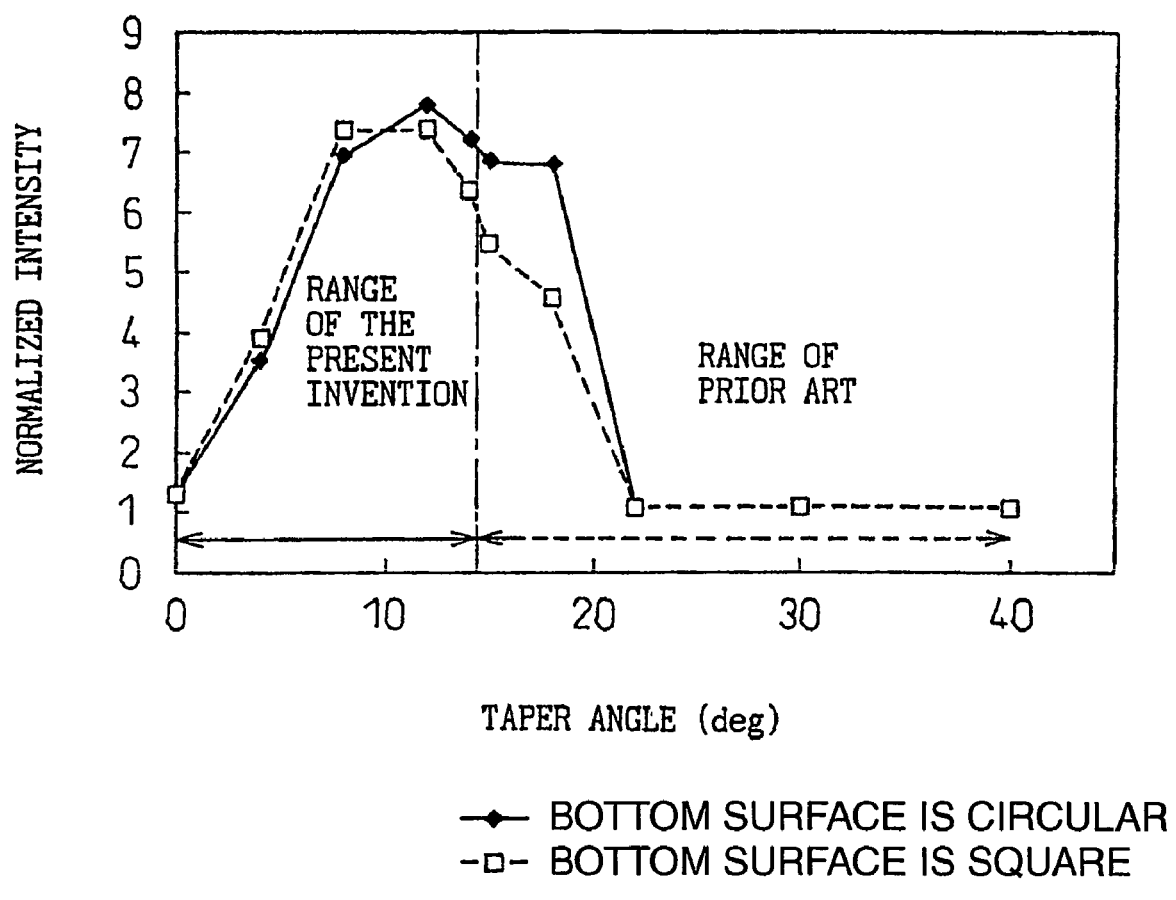
FIG. 7 is a graph of light intensity U.S. taper angle α.
Figure 8:
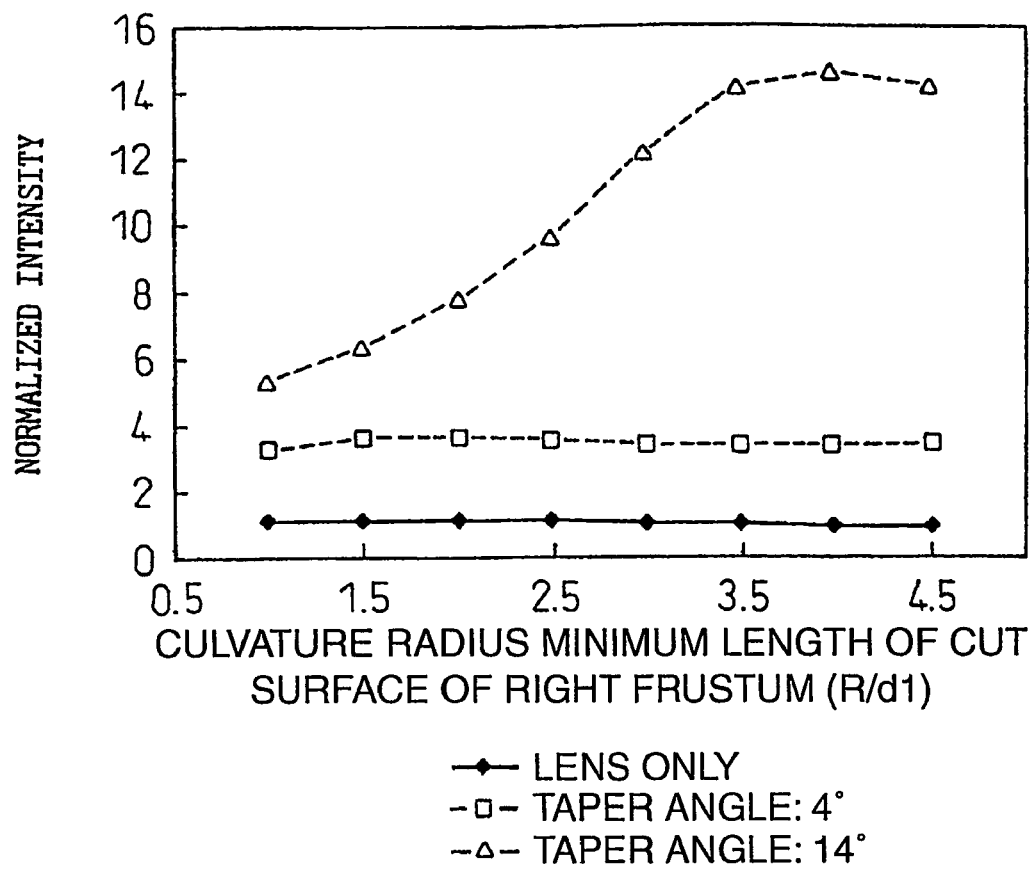
FIG. 8 is a graph of light intensity in case that the curvature of a condensing lens section is varied.

Based on an actual arrangement of an EL light source, self-focusing lens array (SLA) and a photosensitive drum of a copying machine, intensity at the receiving section of the SLA in case that a lens array sheet is disposed directly below the EL light source was simulated to preliminarily design a preferred lens array sheet. FIG. 5 shows a system consisting of an EL light source, lens array sheet, SLA, and photosensitive drum, and FIG. 6 is an enlarged cross-sectional view of the EL light source and lens array sheet. The light emitted from an EL light-emitting section 11 disposed on a support 12 is condensed on a self-focusing array (SLA) 13 through a lens array sheet 1, and then goes out of the SLA 13 to be applied on a photosensitive drum 14. The design was conducted by using TracePro (trade name) ray-tracing software available from Lambda Research Corporation. The light intensity of the lens array sheet was computed when the aspect ratio of the right frustum was 5 and while varying the taper angle α of the right frustum, and the ratio (R/d1) of the curvature radius (R) to the minimum length (d1) of a cut surface of the right frustum for the condensing lens section. The refraction index of the material constituting the lens array was 1.5. FIG. 7 shows a graph of light intensity to taper angle α in case that a lens array sheet having only right frustums was attached to the EL light-emitting section. FIG. 8 shows a graph of light intensity to R/d1 of a condensing lens section in case that a lens array sheet attached to the EL light-emitting section has right frustums having a taper angle α=4° or 14°, or has the condensing lens section only. The light intensity is normalized intensity obtained by dividing the amount of light received by the SLA in case that a lens array sheet is attached to the EL-light emitting section by the amount of light received by the SLA in case that no array sheet is attached to it. From the results of FIGS. 7 and 8, it has been understood that light concentration efficiency is significantly improved by a combination of right frustums having a specific taper angle α, and a condensing lens section.

2. Prototyping a Lens Array Sheet

Based on the above form design, three kinds of optical elements were prototyped with acrylic resin (refraction index n=approx. 1.5) by enlarging a preliminarily designed form similarly. An acrylic square bar is cut and buffed to a mirror finish.

Optical element 1: having right corn frustums each having a taper angle α=14°, an aspect ratio=5, and d1=10 mm (circular surface), and no lens section.

Optical element 2: having right corn frustums each having a taper angle α=14°, an aspect ratio=5, and d1=10 mm (circular surface), and a lens section consisting of spherical lenses each having a thickness=5 mm and R=40 mm.

Optical element 3: having right corn frustums each having a taper angle α=30°, an aspect ratio=5, and d1=10 mm (circular surface), and no lens section.

Figure 9:
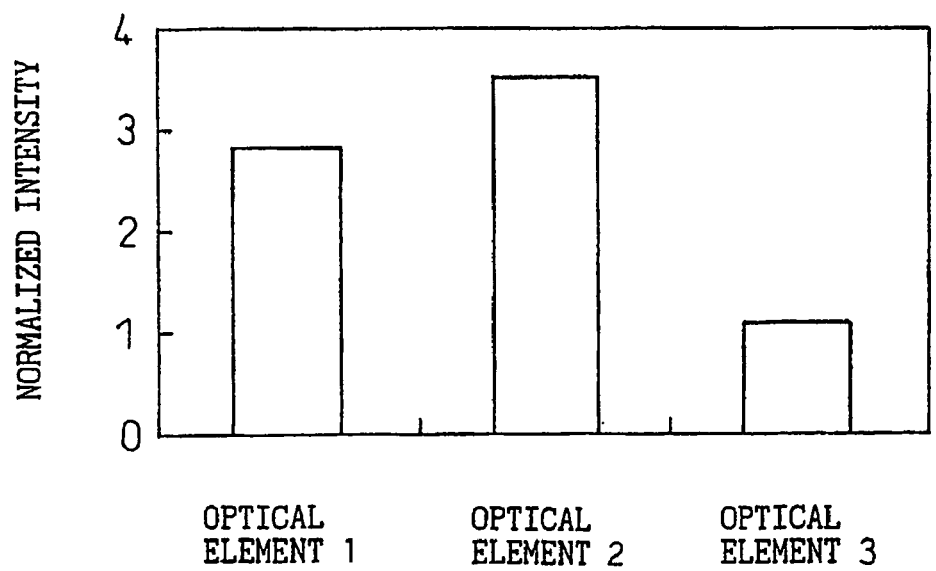
FIG. 9 is a result of the measurement of light intensity for each of prototype optical elements made of acrylic resin in the Examples.

A red LEDs available from Marl (the total light-emitting angle=120°, the incident angle of the highest intensity light θ≈30°) were used for a light source, and a luminance meter BM-9ME available from Topcon was used as a light-amount measuring device. An system was constituted according to that shown in FIG. 5, and light intensity was measured. The measurement result is shown in FIG. 9. The light intensity is indicated with normalized intensity as described above. It is understood that the amount of light concentrated on the light-receiving surface in case of optical elements 2 is 3.8 times that in case of optical elements 3. Furthermore, it is understood that since an optical element having an taper angle of 15° to 45° described in Japanese Unexamined Patent Publication No. 10-253808 is too wide for an EL light source or LED light source, and its total reflection angle does not match such a light source, it cant not efficiently direct the light from the light source to an object to be radiated with the light, thus providing a low light-concentration efficiency.

Example 2

Making a Lens Array Sheet

An example of making a lens array sheet having minute protrusions each having a high aspect ratio is shown below. In detail, a sheet was made as mentioned below, the sheet having protrusions each of which has a square bottom surface having approx. 250 μm sides, a square top surface having approx. 150 μm sides, and a 550 μm height (aspect ratio is 3.7), and which are arranged and connected with each other at an interval of 150 μm by a connecting section.

$C_8$ perfluoro group release agent (C8 perfluorooxide compound having a product name Zonyl FSN available from Dupont) was coated on a wax mold made of paraffin wax having a melting point of 70° C. Next, polymerization resin made by adding Darocure 1173 photoinitiator available from Ciba Specialty Chemicals (0.05 weight %) to hydroethyl acrylate resin (99.95 weight %) was poured into the wax mold under a reduced pressure at ordinary temperature, and then was sealed with polyethylene terephtalate (PET) having 50 μM thickness. 60 mJ/cm$^2$ ultraviolet rays of having a wavelength of approx. 370 nm were applied to the polymerizable resin while cooling it with water to polymerize and cure it. The wax mold was melted with heat and then washed with approx. 70° C. hot water. When the obtained sheet was observed by means of an optical microscope photograph, it was seen that the resin had been poured to the tips of the protrusions and accurately formed into the pattern of the mold. And, the sheet could be released from the mold easily. In addition, a sheet having a lens section consisting of lenses disposed at the positions corresponding to the protrusions was made, and was laminated with the above sheet. Thus, a lens array sheet could be made.

Comparison Example

Cepton 2063 thermoplastic resin available from Kuraray Co., Ltd. was charged into a silicone mold having the same pattern as the wax mold in the above second embodiment under the pressure of approx. 37 MPa at the temperature of 205° C. The thermoplastic resin was cooled to set it, and then it was released from the mold. When the sheet thus obtained was observed by means of an optical microscope photograph, it was seen that air bubbles were in the tips of the protrusions, and the tips of the protrusions were recessed. Thus, a sheet could not been made successfully.

A lens array sheet according to the present invention can efficiently condense diffuse light such as the light from a LED light source or EL light source to an object. Thus, the amount of light to be used can be increased. As a result, the number of self-focusing lens arrays constituting an image-forming lens system of an image-forming apparatus can be reduced. Furthermore, a molding method according to the present invention is excellent in the release of a molded object such as a lens array sheet having minute protrusions having a high aspect ratio, and is capable of replicating the molded object with high accuracy.

What is claimed is:

1. A lens array sheet comprising a transparent base material, a plurality of light-receiving sections each consisting of a transparent right frustum which is provided on the surface of said base material and is tapered outwardly from said base material, and a plurality of condensing lenses disposed on the back of said base material so as to face the respective light-receiving sections, wherein the side face of said right frustum forms a taper angle larger than 0° and less than 15° with the central axial line of said right frustum, and an aspect ratio (H/D) which is a proportion of the height (H) of said right frustum to the minimum length (D) of the cut surface of said right frustum is larger than 0, and no more than 10.

2. The lens array sheet of claim 1, wherein said light-receiving sections are integrated with said base material.

3. The lens array sheet of claim 1, wherein said right frustum is right pyramid frustum, right corn frustum, or right ellipsoid frustum.

4. The lens array sheet of claim 1, wherein said condensing lenses are integrated with said base material.

5. The lens array sheet of claim 1, wherein said condensing lenses are spherical lenses, non-spherical lenses, fresnel lens or cylindrical lenses.

6. The lens array sheet of claim 5, wherein said cylindrical lenses are integrated with said base material and are arranged in parallel with each other to constitute a lenticular lens.

7. The lens array sheet of claim 1, wherein said base material, said light-receiving sections, and/or said condensing lenses are made of energy radiation curing resin.

8. The lens array sheet of claim 7, wherein said energy radiation curing resin is acrylic resin.

* * * * *